United States Patent [19]
Goo

[11] Patent Number: 5,434,635
[45] Date of Patent: Jul. 18, 1995

[54] AUTOMATIC FILM MOVEMENT DEVICE FOR A CAMERA AND DRIVING METHOD THEREFOR

[75] Inventor: Bonjeong Goo, Kyeongsangnam, Rep. of Korea

[73] Assignee: Samsung Aerospace Industries, Ltd., Kyeongsangnam, Rep. of Korea

[21] Appl. No.: 999,412

[22] Filed: Dec. 31, 1992

[30] Foreign Application Priority Data

Mar. 31, 1992 [KR] Rep. of Korea ............... 92-5395

[51] Int. Cl.⁶ .................. G03B 1/18; G03B 1/00
[52] U.S. Cl. ........................ 354/173.11; 354/214
[58] Field of Search .......... 354/173.1, 173.11, 212, 354/213, 214, 215

[56] References Cited

U.S. PATENT DOCUMENTS

| | | | |
|---|---|---|---|
| 4,781,846 | 6/1988 | Yamamoto et al. | 354/468 |
| 4,857,946 | 8/1989 | Tominaga et al. | 354/173.1 |
| 4,933,704 | 6/1990 | Takami et al. | 354/484 |
| 4,967,217 | 10/1990 | Yamamoto et al. | 354/173.11 |
| 5,003,332 | 3/1991 | Watanabe et al. | 354/173.1 |
| 5,012,272 | 4/1991 | Tabata et al. | 354/465 |
| 5,032,858 | 7/1991 | Kobayashi et al. | 354/173.1 |

FOREIGN PATENT DOCUMENTS

| | | |
|---|---|---|
| 58-68732 | 4/1983 | Japan . |
| 62-153843 | 7/1987 | Japan . |
| 63-301931 | 1/1988 | Japan . |
| 4142523 | 5/1992 | Japan . |
| 4155322 | 5/1992 | Japan . |

*Primary Examiner*—M. L. Gellner
*Assistant Examiner*—Nicholas J. Tuccillo
*Attorney, Agent, or Firm*—Francis C. Hand

[57] ABSTRACT

An automatic film movement device for a camera and driving method therefor to suspend a rewind operation temporarily comprises a first stage release switch, a second stage release switch, a comma switch, and a manual film rewind switch. During a rewind operation, activation of the first stage release switch without activating the second stage release switch cause the rewind operation to stop.

15 Claims, 2 Drawing Sheets

AUTOMATIC FILM MOVEMENT DEVICE FOR A CAMERA AND DRIVING METHOD THEREFOR

BACKGROUND OF THE INVENTION

1. Field of the Invention

The present invention relates to an automatic film movement device for a camera and a driving method therefor. More particularly, the invention relates to an automatic film movement device which can stop a film rewind operation temporarily at the time of rewinding the film.

2. Description of the Prior Art

Generally, in the case of ordinary middle class and low class cameras, a user carries out a film rewind operation manually by operating a conversion switch after exposing a film. However, since an amateur or a beginner is usually poor at dealing with the problems which arise when a film rewind device for a camera is out of order, a photographed film can be damaged due to exposure of the photographed film. Therefore, in order to solve this problem, cameras have been developed which are capable of winding and rewinding a film automatically.

In case of a camera provided with an automatic film movement device, the user generally sets a wind-/rewind conversion switch to a wind mode to wind the film automatically and takes a photograph. If one exposure is taken, a motor installed in the camera rotates in a forward direction, so that the wind operation is carried out automatically. When the film is completely used, the film is rewound by setting the conversion switch to a rewind mode and rotating the motor in a reverse direction.

However, in carrying out a film wind operation, if the user sets a wind/rewind conversion switch to the rewind mode unintentionally, the film can be rewound unwantedly. Further, once the user sets the conversion switch to the rewind mode, the user cannot suspend the rewind operation during the operation. Therefore, for example, in a performance hall or in a quite room, the user may become disturbed by a noise made by the driving of the motor until the completion of the film rewind operation.

SUMMARY OF THE INVENTION

Accordingly, it is an object of the invention to be able to suspend a rewind operation of an automatic camera during a predetermined time in the middle of the film rewind operation.

It is another object of the invention to be able to suspend a rewinding operation of an automatic camera in a simple manner.

Briefly, the invention provides an automatic film movement device for a camera which comprises a first stage release switch for activating a means to measure light and distance, a second stage release switch for actuating a shutter, a comma switch for responding to rotation of a sprocket which interlocks with a perforation in a film during each of a wind and rewind operation of the film and a manual film rewind switch to permit manual rewinding of the film in the camera.

The automatic film movement device also employs a control means for outputting a signal to take a photograph in response to actuation of the first and second stage release switches and for outputting a film wind signal to move the film a cut length corresponding to one exposure in response to operation of the comma switch within a prescribed time. The control means also outputs a film rewind signal in case that the comma switch is not operated within the prescribed time or in case the manual film rewind switch is operated. Still further, the control means outputs a suspension signal in response to the first stage release switch being operated during the rewind operation.

In addition, the automatic film movement device employs a motor driving means for rotating a film movement motor in a forward direction in response to the film wind signal from the control means, for rotating the film movement motor in a reverse direction in response to the film rewind signal and for suspending rotation of the film movement motor in the reverse direction in response to the suspension signal.

In accordance with the invention, the film rewind signal is again emitted from the control means in response to a release of the second operation of the first stage release switch. In this way, rewinding of the film can be reinstituted.

The control means is also programmed to output a termination signal in response to the comma switch not operating within the prescribed time during a film rewind operation.

The automatic film movement device may also include an information display means for displaying a film number corresponding to the number of exposure taken as well as a driving means for driving this information display means. In this case, the control means also outputs an output signal to the driving means for reducing the film number displayed on the information display means one by one in response to the comma switch operating within the prescribed time.

Still further, the control means may output a signal for setting the film number on the information display means to "0" in response to the comma switch not operating within the prescribed time.

The invention also provides a driving method for an automatic film movement device for a camera which includes the steps of taking a photograph in response to operation of a first stage release switch and a second stage release switch; rotating a film movement motor in a forward direction to move one cut length of film in the case that a comma switch is operated within film movement motor in a reverse direction in response to the comma switch not operating within the prescribed time or in response to a manual film rewind switch being operated to rewind the film.

In accordance with the invention, the reverse operation of the film movement motor is suspended in response to a second operation of the first stage release switch during rewinding of the film. On the other hand, should the first stage release switch not be operated during the rewinding of the film, rotation of the motor in the reverse direction is maintained.

In accordance with the method, the time for rewinding all the photographed film may be set concurrently with rotation of the motor in the reverse direction along with setting of a film number on an information display means to "0" after completion of this set time.

Still further, the time for rewinding of one cut of film after setting of the rewind time may be set so that the film number on the information display means can be reduced in response to the comma switch being operated within the rewind time of the prescribed one cut of film. In addition, a determination may be made whether the time for rewinding all the photographed film elapses in response to the comma switch being operated within the one cut rewind time.

BRIEF DESCRIPTION OF THE DRAWINGS

These and other objects of the invention will become more apparent from the following detailed description taken in conjunction with the accompanying drawing wherein.

DESCRIPTION OF THE PREFERRED EMBODIMENT

Figure 1:
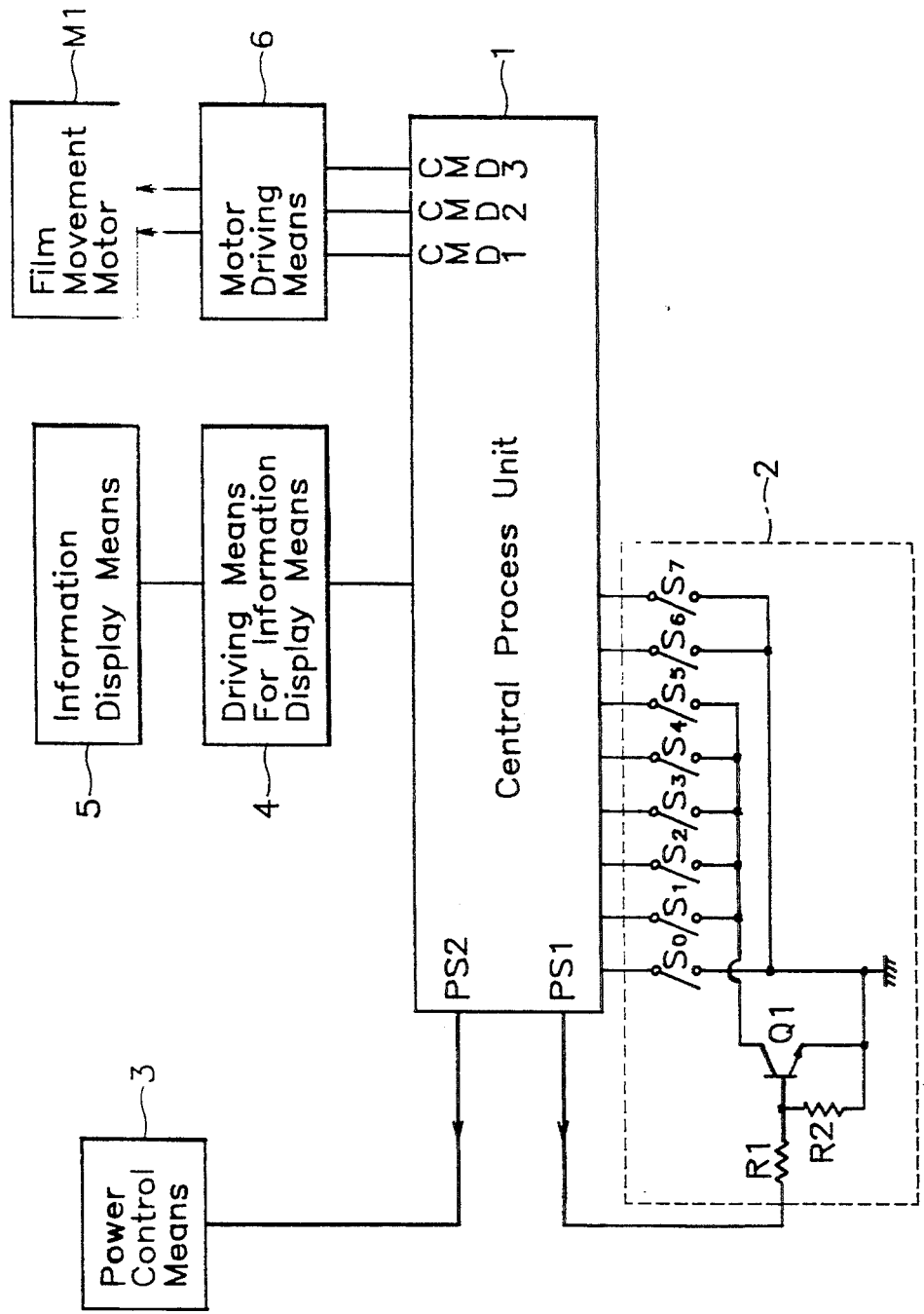
FIG. 1 is a block diagram illustrating a construction of an automatic film movement device for a camera which can temporarily suspend a film rewind operation in accordance with an embodiment of the invention.

Referring to FIG. 1, the automatic film movement device comprises a central processing unit CPU 1, a switch block 2 connected to a first power control terminal PS1 of the CPU 1, a power control means 3 connected to a second power control terminal PS2 of the CPU 1, a driving means 4 for an information display means connected to the CPU 1, an information display means 5 connected to the driving means, a motor driving means 6 connected to the CPU 1, and a film movement motor M1 connected to the motor driving means 6.

The switch block 2 is formed by a plurality of switches S0–S7 each of which has one terminal thereof connected to the CPU 1, and a grounded transistor Q1 with a collector terminal thereof connected to a second terminal of each switch S1–S5 and with an emitter terminal thereof connected to a second terminal of each switch S0, S6, S7. Also, a base terminal of the transistor Q1 is connected to a terminal of a first resistance R1 which has another terminal thereof connected to the first power control terminal PS1 of the CPU 1. The base terminal of the transistor Q1 is also connected to a second resistance R2 whose second terminal is connected to ground.

Figure 2:
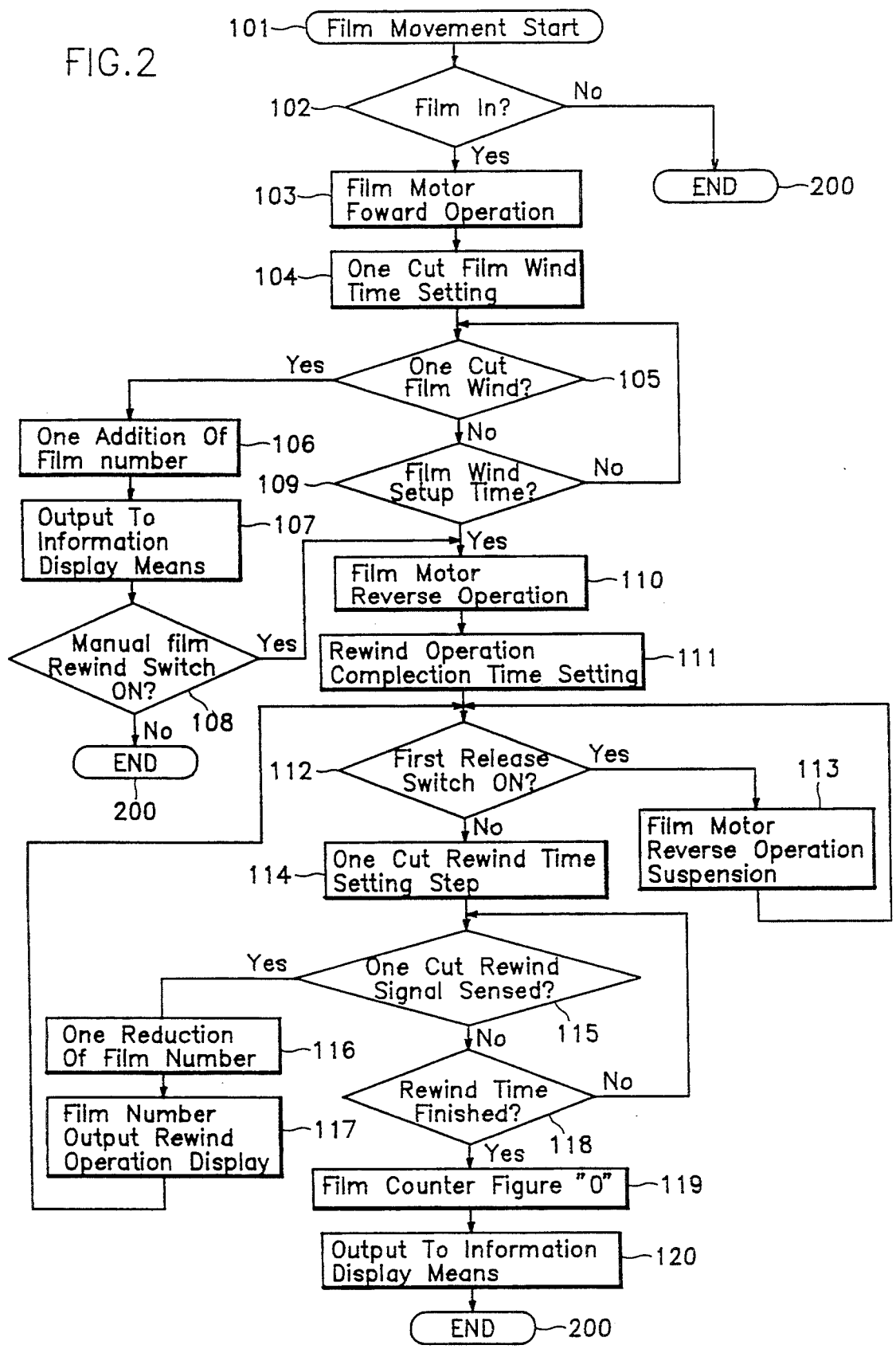
FIG. 2 is a flow diagram illustrating an operation of an automatic film movement device for a camera which can temporarily suspend a film rewind operation in accordance with an embodiment of the invention.

Referring to FIG. 2, the operation of a camera employing the automatic film movement device comprises a step 101 of starting to move a film; a step 102 of deciding whether the film is installed; a step 103 of carrying out a film wind operation by operating a film movement motor; a step 104 of setting a time to wind one cut of the film i.e. a length of film for one exposure; a step 105 of deciding whether the one cut of the film is completely wound; a step 106 of adding one to the number of a photographed film when the one cut of the film is wound; a step 107 of outputting varied information to an information display means; a step 108 of deciding whether a manual film rewind switch is operated; and a step 200 of terminating all operations in response to the manual film rewind switch not being ON.

The operation of the camera also includes a step 109 of deciding whether the set film wind time elapses; a step 110 of rotating the film movement motor in a reverse direction to rewind the film; a step 111 of setting the termination time of the film rewind operation; a step 112 of deciding whether the operation for suspending the film rewind operation is carried out; a step 113 of suspending the operation of the motor when the operation for suspending the film rewind operation is carried out; a step 114 of setting the time for rewinding one cut of the film; a step 115 of deciding whether one cut of the film is rewound; a step 116 of reducing the number of the photographed film one by one; and a step 117 of indicating the number of the film varied in the information display means and that the rewind operation is being carried out.

The operation of the camera also includes a step 118 of deciding whether the film rewind operation is terminated; a step 119 of setting the number of the photographed film to "0"; a step 120 of displaying a exposure number to "0" in the information display means; and a step 200 of terminating all operations.

The operation in accordance with the above-mentioned description of the present invention is as follows:

First, in the switch block 2 (FIG. 1), a plurality of switches S0–S7 which are capable of carrying out various functions for the camera are connected to the CPU 1. For example, switch S0 may be operated by a camera lens cap (not shown); switch S1 acts as a first stage release switch for activating a means to measure light and distance; switch S2 acts as a second stage release switch for activating a shutter; switch S6 responds to rotation of a sprocket which is used to wind or unwind a film and switch S7 acts as a manual rewind switch.

Of note, a "comma" switch is a switch which transfers one frame of the film in a camera.

For example, a user can minimize leaked current which is leaked in accordance with an ON/OFF operation of the switch S0 when the camera is not in use. Namely, when the switch S0 is turned OFF, a low level "L" output signal is applied to the first power control terminal PS1 of the CPU 1 to prevent the leakage of the power made in accordance with the ON/OFF operation of each switch S1–S5 due to the inadvertence or mistake of the user in case the user does not use the camera with a lens cap opened or closed. A the high level "H" output signal is applied to the first power control terminal PS1 in case the switch S0 is ON and the user uses the camera.

Therefore, the leakage of the power current can be prevented since the switches S1–S5 are operated normally by the high-level "H" signal being applied to the base terminal of the transistor Q1 through the resistances R1, R2 when the camera is used and the transistor Q1 is turned OFF by the low level "L" signal being applied when the camera is not to be used.

As described in the above, the CPU 1 senses the state of the power control switch S0 and outputs a corresponding control signal to the power control means 3 through the second power control terminal PS2 to minimize the leaked power current used in each circuit of the camera. Thus, the power control means 3 switches the power used in each electronic circuit of the camera to the low level "L" in response to the control signal from the second power control terminal PS2 corresponding to the power control switch S0 being in the OFF state. Also, the power control means 3 switches the power to the high level "H" in case the power control switch S0 is in the ON state to use the electronic circuits of the camera which require a power supply.

As described in the above, the CPU 1 outputs a film movement signal for winding the film after one cut of film is exposed in accordance with the operations of the first and second release switches S1, S2. For example, operation of the release switches S1, S2 may be caused by pressing a shutter button (not shown) in two stages. Firstly, the user presses the shutter button half-way and the first stage release switch S1 is actuated thereby. Secondly, the user presses the shutter button to complete the remaining half of the its travel length and the second stage release switch S2 is actuated thereby. Thus, the two switches S1, S2 are actuated by one button.

The CPU 1 senses whether the film is installed in a film tube; STEP 101. The CPU 1 immediately terminates the program if the CPU 1 senses that the film is not installed in the film box in accordance with the operation of the film sensitivity switches S3–S5 which automatically sense information about the used film or that the CPU 1 cannot sense the film in the film tube in this step; STEP 200.

After installation of the film in the camera, a prescribed cut of the film is wound to a ready state wherein an exposure is available for the camera to shoot. This ready position of the film can be checked by counting the rotations of the sprocket geared to a perforation in the film. The rotation of the sprocket can be sensed by a means which produces an electrical signal corresponding to the rotation of the sprocket.

After the film is installed and is ready, the next step proceeds. The shutter button is depressed to activate the switches S1, S2 to take a photograph. Then, in order to wind the photographed (i.e. exposed) one cut of the film, the low level "L" signal is outputted to the first motor control terminal CMD1, the high level "H" signal is outputted to the second motor control means CMD2, and the low level "L" signal is outputted to the third motor control means CMD3, so that the photographed film is wound (i.e. advanced) by rotating the motor M1 in the forward direction.

To determine if the cut of the film is wound, the CPU 1 sets a time period sufficient for winding one cut of the photographed film. The completion state of the one cut film wind operation is determined by operation of the comma switch S6 when the wind operation of the exposed cut of the film is finished; STEP 104.

Since the comma switch S6 operates and inputs a signal to the CPU 1 if the one cut of the film is moved by the rotation of the sprocket engaged with the film perforation, the CPU 1 perceives that the movement operation of the photographed one cut of film is finished if the comma switch S6 is operated. Thus, in response, the CPU 1 adds one to the number of the photographed film in step 106. The driving means 4 for the information display means also operates the information display means 5 using display elements, such as a liquid crystal display, a light emitting diode and the like, so that the information display means 5 indicates the number of the photographed film added by one in step 107.

The CPU 1 decides whether the manual film rewind switch S7 in the switch block 2 is turned ON or OFF in the step 108. If the film rewind switch S7 is turned ON (indicating that the film is completely exposed), the film rewind operation is carried out in the step 110. If the film rewind switch S7 is turned OFF (indicating that the film is only partially exposed), the photographed film wind operation is terminated in the step 200.

However, if the comma switch S6 is not operated in the step 105 and the signal of the comma switch S6 is not sensed during the set time in the step 109, namely, the movement operation of the one cut film is not completed, the CPU 1 considers the photographed cut of film as the last exposure. Hence, the CPU 1 is programmed to output the low level "L" signal to the first motor control terminal CMD1, the low level "L" signal to the second motor control terminal CMD2, and the high level "H" signal to the third motor control terminal CMD3. The motor M1 is then rotated in the reverse direction in step 110, and a period of time sufficient to rewind the entire photographed film is set in step 111.

The CPU 1 senses the state of a first stage release switch after the CPU 1 sets the rewind time in the step 111. At this time, in case the user turns ON the first stage release switch S1 by depressing the shutter button halfway, the CPU 1 outputs the low level "L" signal to the first motor control terminal CMD1, and outputs the high level "H" signal to the second and third motor control terminals CMD2, CMD3 to suspend the reverse operation of the motor M1 for rewinding the film. Hence, the reverse operation of the motor M1 is suspended for a prescribed time in the step 113.

In case that the first stage release switch S1 is turned OFF by releasing of the shutter button, the CPU 1 sets the time at which the signal sensed by the comma switch S6 is inputted after rewinding the photographed one cut of film in the step 114. If the exposed film is rewound by the length of one cut, the comma switch S6 is operated and the signal is sensed in the step 115. The CPU 1 then reduces the number of the photographed film in the information display means 5 in the step 116, and makes the information display means 5 indicate the reduced film number by operating the driving means 4 for information display means in the step 117.

If the exposed cut of film is rewound by the abovementioned operation, the CPU 1 returns to step 112, and repeats the above-mentioned operations after sensing the state of the first stage release switch S1.

On the other hand, if the CPU 1 does not sense the operation signal of the comma switch S6 in the step 115 since the comma switch S6 does not operate any more, in the step 118, the CPU 1 checks the setup time for the rewind operation set in the above step 111. If the rewind operation proceeding time does not reach the setup time, the CPU 1 continues to sense the rewind signal until the setup time and checks the setup time. If the rewind operation proceeding time reaches the setup time, the CPU 1 considers this as the completion of the film rewind operation, and brings the film counter figure to "0" in the step 119. The CPU 1 also terminates all the operations in the step 200 after the CPU 1 indicates the number of the photographed film as "0" in the information display means 5 by operating the driving means 4.

The effect of the present invention lies in that the user can temporarily suspend the rewind operation during a desired time by operating a switch already a part of camera.

In addition, the CPU 1 can sense information regarding the film by using the sensing switch which is used to sense the sensitivity of the film, i.e. the ASA or DIN number of the film to also check whether the film is installed in the camera or not. Hence, an extra switch for sensing the film is not necessary. This contributes to a minimization of the camera. The CPU 1 can also check whether the film is installed exactly by checking the signal outputted by the rotation of the sprocket geared with the perforation of the film after an exposure has been taken and the film advanced by one exposure length.

What is claimed is:

1. An automatic film movement device for camera comprising:

a first stage release switch for activating a means to measure light and distance;

a second stage release switch for activating a shutter;

a comma switch for responding to rotation of a sprocket interlocking with a perforation in a film during each of a wind and rewind operation of the film;

a manual film rewind switch to permit manual rewinding of the film in the camera;

a control means for outputting a signal to take a photograph in response to actuation of said first and second stage release switches, outputting a film wind signal to move the film a cut length corresponding to one exposure in response to operation of said comma switch within a prescribed time, outputting a film rewind signal in response to said comma switch not being operated within said prescribed time or in response to said manual film rewind switch being operated, and outputting a suspension signal in response to said first stage release switch being operated during said rewind operation; and a motor driving means for rotating a film movement motor in a forward direction in response to said film wind signal from said control means, for rotating the film movement motor in a reverse direction in response to said film rewind signal, and for suspending rotation of the film movement motor in said reverse direction in response to said suspension signal.

2. An automatic film movement device as set forth in claim 1, wherein said film rewind signal is outputted from said control means in response to a release of said first stage release switch after emission of said suspension signal.

3. An automatic film movement device as set forth in claim 1, wherein said control means outputs a termination signal in response to said comma switch not operating within said prescribed time during a film rewind operation.

4. An automatic film movement device as set forth in claim 3, further comprising an information display means for displaying a film number corresponding to the number of exposure taken and a driving means for driving said information display means and wherein said control means outputs an output signal to said driving means for reducing the film number displayed on said information display means one by one in response to said comma switch operating within said prescribed time.

5. An automatic film movement device as set forth in claim 4, wherein said control means outputs a signal for setting the film number on said information display means to "0" in response to said comma switch not operating within said prescribed time.

6. A driving method for an automatic film movement device for a camera comprising the steps of;

taking a photograph in response to operations of a first stage release switch and a second stage release switch;

rotating a film movement motor in a forward direction to move one cut length of film in response to operation of a comma switch within a prescribed time after taking the photograph;

rotating the film movement motor in a reverse direction in response to said comma switch not operating within the prescribed time or in response to a manual film rewind switch being operated to rewind the film;

suspending the reverse operation of the film movement motor in response to a second operation of the first stage release switch during rewinding of the film; and maintaining rotation of the motor in the reverse direction in response to the first stage release switch not being operated during the rewinding of the film.

7. A driving method as set forth in claim 6, further comprising the steps of:

setting the time for rewinding all the photographed film concurrently with rotating the motor in a reverse direction; and setting a film number on an information display means to "0" after completion of said set time.

8. A driving method as set forth in claim 7, further comprising the steps of:

setting the time for rewinding one cut of film after setting the rewind time;

reducing one from the film number on the information display means in response to the comma switch being operated within the rewind time of the prescribed one cut of film; and deciding whether the time for rewinding all the photographed film elapses in response to the comma switch being operated within the one cut rewind time.

9. In combination a camera having at least a first stage release switch for activating a means to measure light and distance; and a manually operated film rewind switch for rewinding an exposed film;

a motor for selectively winding and unwinding a film in said camera; and a central processing unit for actuating said motor in response to actuation of said film rewind switch to rewind a film, said processing unit being connected to said first stage release switch to suspend operation of said motor in response to actuation of said first stage release switch during rewinding of the film.

10. A driving method for an automatic film movement device for a camera comprising the steps of winding a photographed film after completion of a photograph operation;

emitting a signal via a comma switch in response to the film being advanced one cut;

determining whether a manual film rewind switch is ON or OFF in response to said signal from the comma switch;

terminating winding of the film in response to the rewind switch being OFF;

rewinding the film in a reverse direction in response to the rewind switch being ON;

determining whether a set film wind set time corresponding to an advance of one cut of film elapses without a signal being emitted via the comma switch;

rewinding the film in a reverse direction in response to the signal from the comma switch not being emitted within said set time;

determining whether a first stage release switch is operated during rewinding of the film;

stopping rewinding of the film in response to operation of the first stage release switch during rewinding of the film to suspend rewinding thereof;

determining whether a set film rewind set time corresponding to a rewinding of one cut of film elapses without a signal being emitted via the comma switch in response to the first stage release switch not being operated;

continuing rewinding of the film in response to the set film rewind set time elapsing with a signal being emitted via the comma switch; and terminating rewinding of the film in response to the set film rewind set time elapsing without a signal being emitted via the comma switch.

11. A driving method as set forth in claim 10 further comprising the steps of:

increasing the film number by one in response to said signal from the comma switch indicating an advance of the film and displaying the film number through an information display means.

12. A driving method as set forth in claim 10 further comprising the steps of reducing the film number by one in response to the set film rewind set time elapsing with a signal being emitted via the comma switch and displaying the film number through an information display means.

13. A driving method for an automatic film movement device for a camera comprising the steps of winding a photographed film after completion of a photograph operation;

emitting a signal via a comma switch in response to the film being advanced one cut;

determining whether a manual film rewind switch is ON or OFF in response to said signal from the comma switch;

terminating winding of the film in response to the rewind switch being OFF;

rewinding the film in a reverse direction in response to the rewind switch being ON;

determining whether a first stage release switch is operated during rewinding of the film;

stopping rewinding of the film in response to operation of the first stage release switch during rewinding of the film to suspend rewinding thereof;

determining whether a set film rewind set time corresponding to a rewinding of one cut of film elapses without a signal being emitted via the comma switch in response to the first stage release switch not being operated;

continuing rewinding of the film in response to the set film rewind set time elapsing with a signal being emitted via the comma switch; and terminating rewinding of the film in response to the set film rewind set time elapsing without a signal being emitted via the comma switch.

14. A driving method for an automatic film movement device for a camera comprising the steps of winding a photographed film after completion of a photograph operation;

emitting a signal via a comma switch in response to the film being advanced one cut;

determining whether a set film set time corresponding to an advance of one cut of film elapses without a signal being emitted via the comma switch;

rewinding the film in a reverse direction in response to the signal from the comma switch not being emitted within said set time;

determining whether a first stage release switch is operated during rewinding of film;

stopping rewinding of the film in response to operation of the first stage release switch during rewinding of the film to suspend rewinding thereof;

determining whether a set film rewind set time corresponding to a rewinding of one cut of film elapses without a signal being emitted via the comma switch in response to the first stage release switch not being operated;

continuing rewinding of the film in response to the set film rewind set time elapsing with a signal being emitted via the comma switch; and terminating rewinding of the film in response to the set film rewind set time elapsing without a signal being emitted via the comma switch.

15. A method for an automatic film movement device for a camera comprising the steps of advancing a photographed film after completion of a photograph operation;

rewinding the film in a reverse direction in response to completion of a series of photograph operations;

determining whether a first stage release switch is operated during rewinding of the film;

stopping rewinding of the film in response to operation of the first stage release switch during rewinding of the film to suspend rewinding thereof;

emitting a signal via a comma switch in response to the film being rewound one cut;

determining whether a set film set time corresponding to a rewinding of one cut film elapses without a signal being emitted via the comma switch in response to the first stage release switch not being operated;

continuing rewinding of the film in response to the set film rewind set time elapsing with a signal being emitted via the comma switch; and terminating rewinding of the film in response to the set film set time elapsing without a signal being emitted via the comma switch.

* * * * *